United States Patent
Gotti

(10) Patent No.: US 11,858,183 B2
(45) Date of Patent: Jan. 2, 2024

(54) PROCESS FOR MOULDING A SPORTS HELMET

(71) Applicant: KASK S.P.A., Chiuduno (IT)

(72) Inventor: Angelo Gotti, Nembro (IT)

(73) Assignee: KASK S.P.A., Chiuduno (IT)

(*) Notice: Subject to any disclaimer, the term of this patent is extended or adjusted under 35 U.S.C. 154(b) by 0 days.

(21) Appl. No.: 17/813,565

(22) Filed: Jul. 19, 2022

(65) Prior Publication Data

US 2022/0347898 A1    Nov. 3, 2022

Related U.S. Application Data

(62) Division of application No. 17/059,016, filed as application No. PCT/IB2019/056235 on Jul. 22, 2019.

(30) Foreign Application Priority Data

Jul. 27, 2018 (IT) .................. 102018000007587

(51) Int. Cl.
    *B29C 45/14* (2006.01)
    *B29K 25/00* (2006.01)
    *B29L 31/48* (2006.01)

(52) U.S. Cl.
    CPC .... *B29C 45/14065* (2013.01); *B29K 2025/06* (2013.01); *B29L 2031/4821* (2013.01)

(58) Field of Classification Search
    CPC ................................................. B29C 45/14065
    See application file for complete search history.

(56) References Cited

U.S. PATENT DOCUMENTS

| 1,639,312 A | 8/1927 | Schrock |
| 4,466,138 A * | 8/1984 | Gessalin ................. B29C 70/68 2/410 |

(Continued)

FOREIGN PATENT DOCUMENTS

| CN | 105987642 A | 10/2016 |
| EP | 0 317 446 A | 5/1989 |

OTHER PUBLICATIONS

Combined Chinese Office Action and Search Report issued in Chinese Patent Application No. 201980032369.1 dated Dec. 10, 2021 (w/ English Translation).

(Continued)

*Primary Examiner* — Edmund H Lee
(74) *Attorney, Agent, or Firm* — Oblon, McClelland, Maier & Neustadt, L.L.P.

(57) ABSTRACT

A support template for moulds for sports helmets, in particular cycling helmets, provided with at least one frame includes: at least one support portion, placed on a first side of the frame, for the support of at least one component of a helmet to be obtained by a moulding or co-moulding process, the support portion being configured to keep the respective component of the helmet to be obtained according to a predetermined position inside a respective mould; at least one centring portion placed on the first side of the frame and arranged to engage a respective centring seat made on the respective mould so as to ensure the alignment of the latter with the support template and keep the centred positioning of the component of the helmet according to a predetermined configuration; and at least one grip portion to allow manual engagement of the support template by an operator.

1 Claim, 3 Drawing Sheets

(56) References Cited

U.S. PATENT DOCUMENTS

| | | | | |
|---|---|---|---|---|
| 4,586,886 A | * | 5/1986 | Prischak | B29C 31/008 |
| | | | | 425/189 |
| 4,615,438 A | | 10/1986 | Rosenberg et al. | |
| 5,119,516 A | * | 6/1992 | Broersma | B29C 70/887 |
| | | | | 2/412 |
| 5,477,563 A | * | 12/1995 | Gentes | B29C 70/70 |
| | | | | 2/425 |
| 5,481,762 A | | 1/1996 | Gentes et al. | |
| 5,565,155 A | | 10/1996 | Cheng-Hung | |
| 5,598,588 A | * | 2/1997 | Lee | B29C 33/0033 |
| | | | | 2/421 |
| 6,221,304 B1 | * | 4/2001 | Harris | B29C 31/008 |
| | | | | 425/127 |
| 7,140,049 B2 | * | 11/2006 | Lang-Ree | A42B 3/10 |
| | | | | 2/412 |
| 7,913,325 B2 | * | 3/2011 | Bullock | A42B 3/066 |
| | | | | 2/412 |
| 8,020,219 B2 | * | 9/2011 | Jacobsen | A42B 3/066 |
| | | | | 2/421 |
| 2022/0203588 A1 | * | 6/2022 | Gotti | B29C 45/64 |

OTHER PUBLICATIONS

International Search Report issued in PCT/IB2019/056235 dated Oct. 29, 2019.

\* cited by examiner

PROCESS FOR MOULDING A SPORTS HELMET

CROSS-REFERENCE TO RELATED APPLICATIONS

This application is a division of U.S. application Ser. No. 17/059,016 filed Nov. 25, 2020, the entire contents of which is incorporated herein by reference. U.S. application Ser. No. 17/059,016 is a 371 of International Application No. PCT/IB2019/056235 filed Jul. 22, 2019, and claims the benefit of priority from prior Italian Application No. 102018000007587 filed Jul. 27, 2018.

BACKGROUND OF THE INVENTION

Field of the Invention

The present invention refers to a support template for moulds for sports helmets, in particular cycling helmets.

Another object of the present invention is a moulding process of a sports helmet, in particular of a cycling helmet.

The present invention is aimed at the field of the production of sports helmets and, in detail, of cycling helmets.

Description of the Related Art

As known, cycling helmets are obtained by means of suitable moulds that each has a female half-mould and a male half-mould.

Every mould is provided with respective feeding channels of the polystyrene to be injected for the formation of the helmet, as well as with a plurality of holes for feeding the steam necessary for the moulding process.

During the moulding process the polystyrene, in the form of small balls, undergoes a softening and expansion process inside the cavity of the mould so as to take on the shape of the product to be obtained, in other words of the base body of the helmet responsible for absorbing impacts.

Once the base body has been obtained, the latter is removed from the mould to allow an operator to mount further components of the helmet, such as the upper shell, the lower ring or under-shell and other possible components.

The base body together with the additional components of the helmet is once again inserted into the mould to be subjected to a second moulding process aimed at definitively binding the additional components to the base body itself.

Once the second moulding process is finished, the helmet obtained is removed again from the mould to be subjected to the last operations of finishing, application of the padding and quality control.

Although the moulding process described above allows cycling helmets of high quality and workmanship to be made, the Applicant has found that they are not, however, devoid of drawbacks and can be improved in different ways, mainly in relation to the number of steps to carry out the moulding process, to the execution times of every cycle of the moulding process, as well as to the quality of the product obtained.

In particular, the Applicant has found that the number of steps for the moulding of each helmet to be obtained is very high. Indeed, as well as having to carry out two moulding cycles for each helmet to be obtained the conventional process provides a series of manual steps that must be carried out by the operator between one moulding cycle and the other, like for example mounting the additional components of the helmets or positioning further components or inserts to be incorporated in the helmet inside the mould.

Of course, doubling the moulding cycles for each helmet to be obtained together with the time needed to carry out the mounting steps of the additional components like those of positioning the components inside the moulds, have a significant impact on the total production time of helmets, with substantial repercussions on the production costs thereof.

It should also be considered that the mounting operations of the additional components on the respective base bodies of the helmets to be obtained like those relative to the positioning inside the moulds of components and/or inserts to be incorporated in the helmets, substantially increases the inactivity times of the moulds and consequently the downtimes of the moulding process.

Finally, it should be noted that the process for making helmets described above is unable to guarantee the desired quality sought by the manufacturer since the helmets obtained by the moulding process can be subject to noticeable defects at the overlapping areas between the additional components, in other words between the upper shell and the lower ring or under-shell, due to minimal displacements of one component with respect to the other during the moulding or during the insertion and blocking steps of the base body in the mould.

BRIEF SUMMARY OF THE INVENTION

The main purpose of the present invention is to propose a support template for moulds for sports helmets, in particular cycling helmets and a moulding process of a sports helmet, in particular a cycling helmet, able to solve the problems encountered in the prior art.

Therefore, a purpose of the present invention is to simplify the process of moulding and obtaining cycling helmets.

Another purpose of the present invention is to significantly reduce the number of steps to be carried out between the moulding cycles and the steps carried out by the operator.

Another purpose of the present invention is to reduce the downtimes when the moulds are inactive.

A further purpose of the present invention is to reduce the total production times of helmets and to increase the productivity of the moulding process.

Another purpose of the present invention is to reduce the total production costs of cycling helmets.

A further purpose of the present invention is to ensure a high quality of the helmets produced, completely eliminating or reducing as much as possible the risks of defects at the overlapping areas between the upper shell and the lower ring or the under-shell.

The purposes specified above and yet others are substantially accomplished by a support template for moulds for sports helmets, in particular cycling helmets and a moulding process of a sports helmet, in particular a cycling helmet, as described and claimed in the following claims.

The description of a preferred, but not exclusive, embodiment of a support template for moulds for sports helmets, in particular cycling helmets and a moulding process of a sports helmet, in particular of a cycling helmet, in accordance with the present invention is now given, as an example.

BRIEF DESCRIPTION OF THE SEVERAL VIEWS OF THE DRAWINGS

Such a description will be carried out hereinbelow with reference to the attached drawings, provided only for indicating purposes and therefore not limiting, in which.

DETAILED DESCRIPTION OF THE INVENTION

Figure 1:
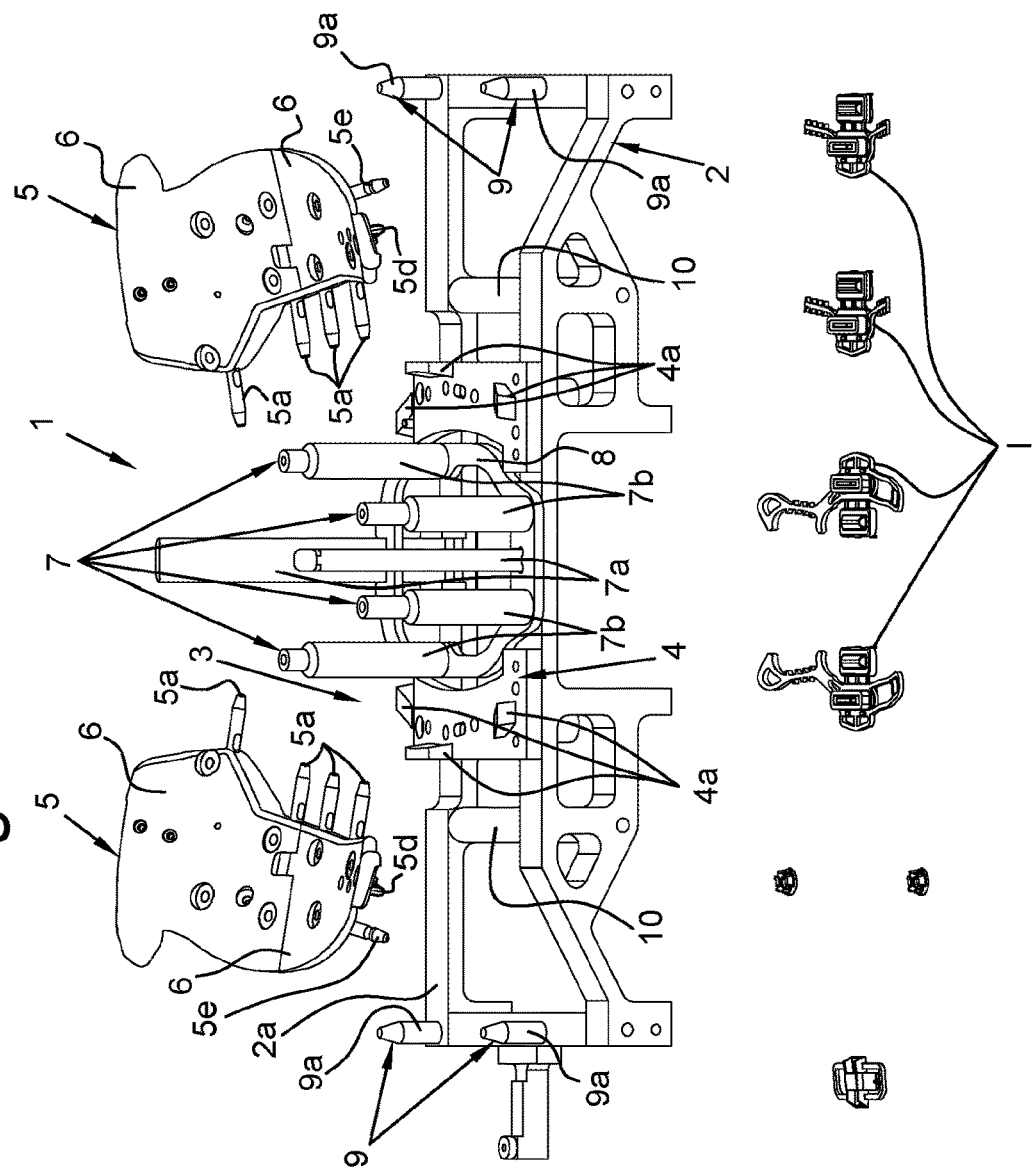
FIG. 1 is a schematic perspective view of a support template for moulds for sports helmets, in particular cycling helmets, represented with some elements dismounted and with some components and/or inserts of a helmet to be obtained.
Figure 1:
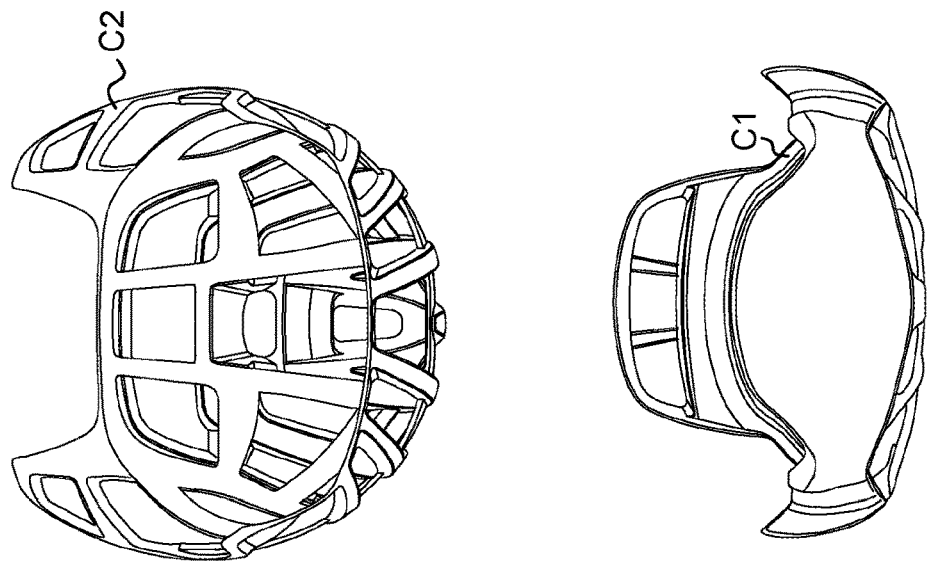
Figure 2:
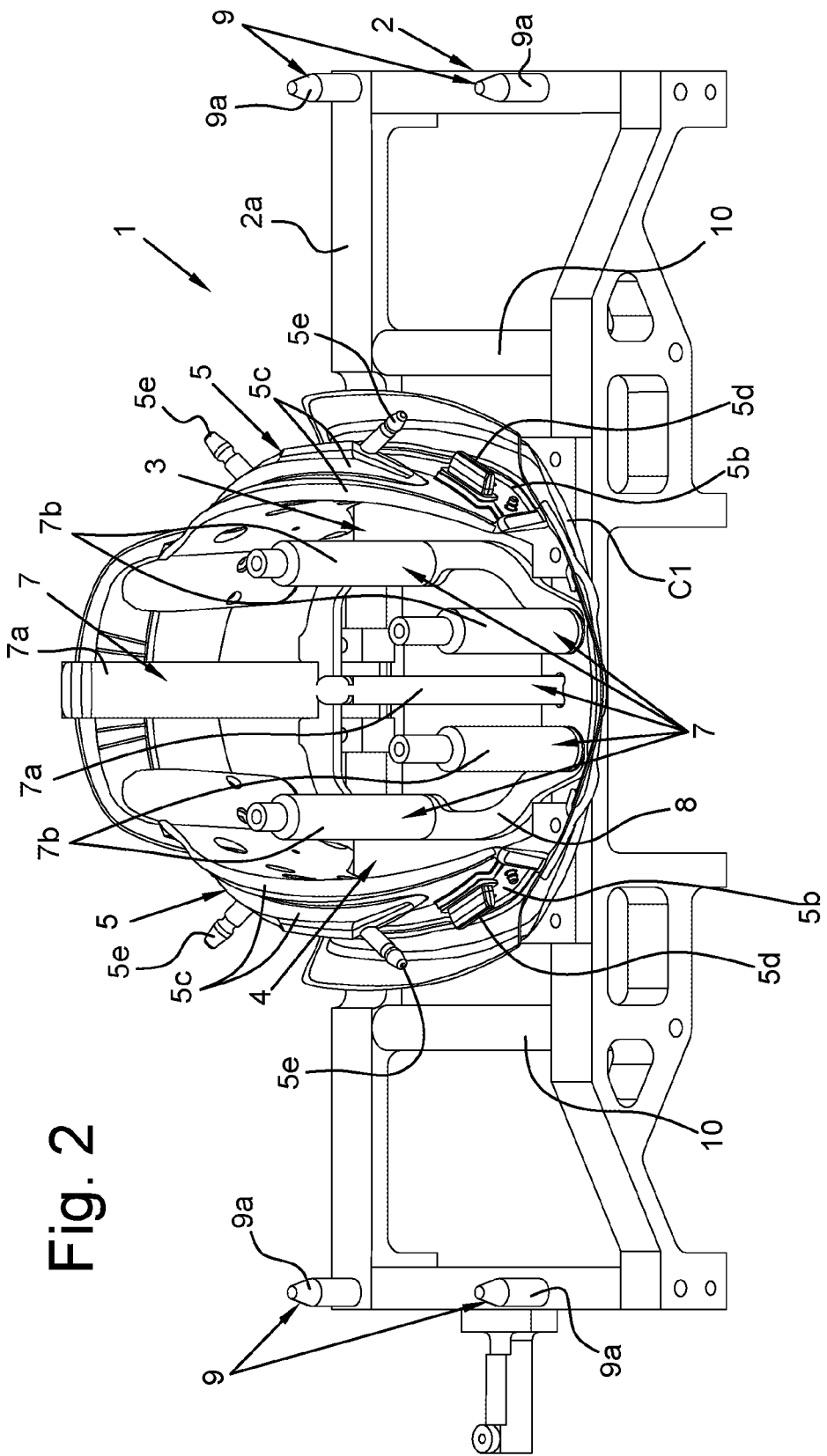
FIG. 2 is a schematic perspective view of the support template according to FIG. 1, represented with a first component and some inserts of the helmet to be obtained engaged on it.
Figure 3:
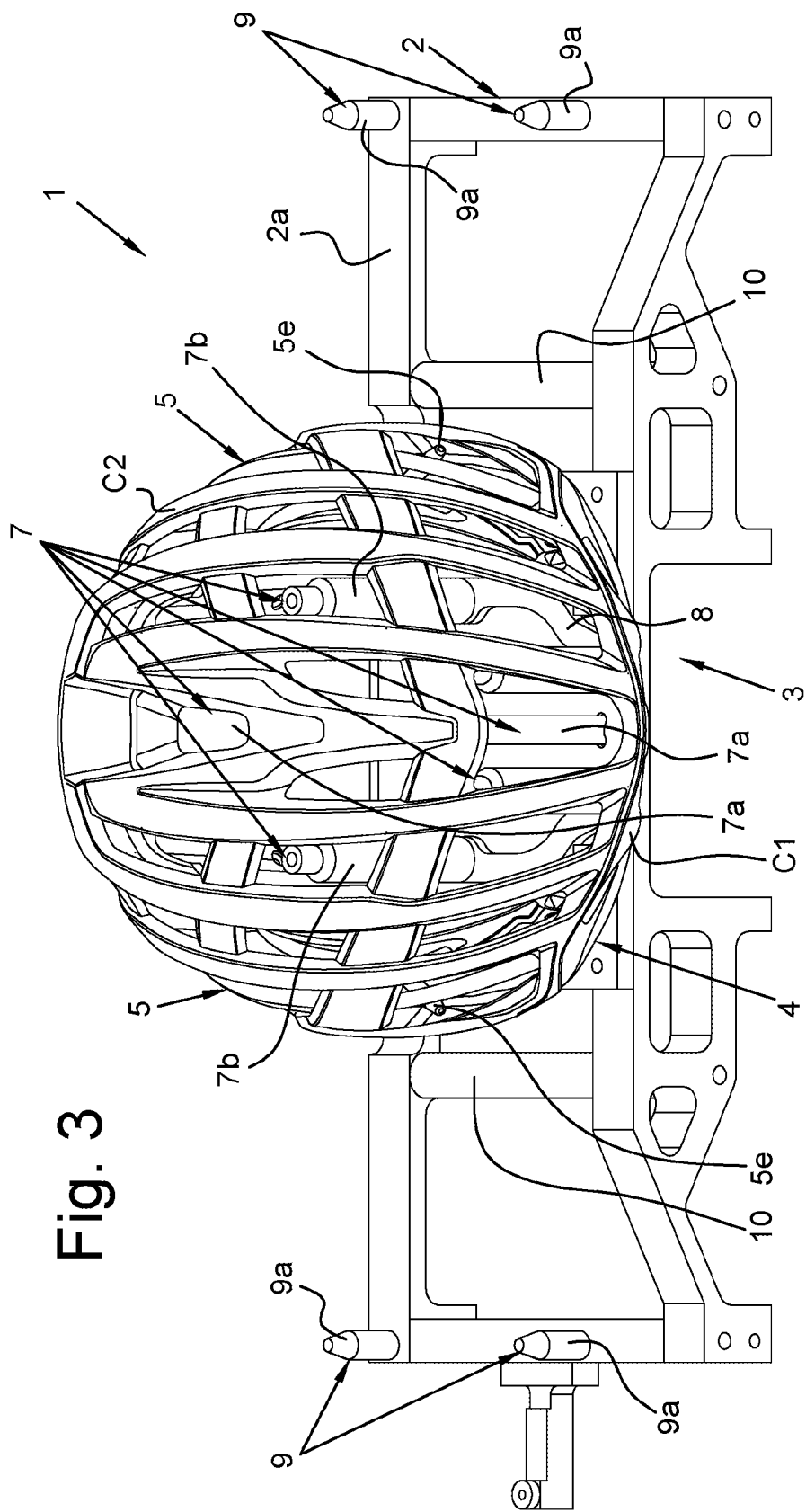
FIG. 3 is a schematic perspective view of the support template according to FIGS. 1 and 2, also represented with a second component of the helmet to be obtained engaged on it.

With reference to FIGS. 1 to 3, reference numeral 1 wholly indicates a support template for moulds for sports helmets, in particular cycling helmets, in accordance with the present invention.

As shown in FIGS. 1 to 3, the support template 1 is provided with at least one frame 2, optionally substantially square in shape, preferably substantially rectangular, which comprises at least one support portion 3 for the support of at least one component C1, C2 of a helmet to be obtained by means of a moulding or co-moulding process, placed on a first side 2a of the frame 2.

The support portion 3 is advantageously configured to keep the respective component C1, C2 of the helmet to be obtained according to a predetermined position inside a respective mould S.

In detail, the support portion 3 of the frame 2 of the support template 1 comprises at least one support surface 4, preferably two support surfaces 4 placed in a mirroring manner with respect to a median plane of the frame 2.

Each support surface 4 of the support portion 3 is provided with corresponding support projections 4a (FIG. 1), preferably consisting of corresponding support blocks, for the rest of a first component C1 of the helmet to be obtained, preferably a lower ring C1 of the shell of the helmet, optionally according to a position that is spaced apart from the respective support surface 4.

The support portion 3 also comprises, for each support surface 4, at least one support element 5, preferably at least partially arched.

Each support element 5 is engageable with the respective support surface 4 transversally with respect to the latter by means of corresponding engaging pins 5a (FIG. 1).

As shown in FIG. 2, each support element 5 is advantageously provided with at least one first rest portion 5b for the lateral rest of the first component C1 of the helmet to be obtained and with at least one second rest portion 5c for the rest of a second component C2 of the helmet to be obtained, preferably the upper shell of the helmet itself.

Advantageously, each support element 5 comprises at least one support projection 5d (FIG. 2), preferably two placed at opposite ends of the respective support element 5, responsible for supporting at least one insert I (FIG. 1) of the helmet to be obtained, in particular a respective "clip", according to a predetermined position inside the mould and at least one support appendage 5e for the rest of the second component C2 of the helmet to be obtained.

Advantageously, each support element 5 is provided with at least two structural portions 6 (FIG. 1) removably engageable with one another by means of corresponding intermediate coupling elements (not visible in the attached figures).

Preferably, the intermediate coupling elements of the structural portions 6 of each support element 5 allow the disengagement of one structural portion 6 with respect to the other by means of at least one relative rotation movement thereof.

Always with reference to FIGS. 1 and 2, the support portion 3 of the frame 2 also comprises at least one support protrusion 7 that extends transversally from the first side 2a of the frame 2 in proximity to at least one of the support surfaces 4.

In detail, it is preferable for the support portion 3 of the frame 2 to comprise a plurality of support protrusions 7 that extend transversally from the first side 2a of the frame 2 between the two support surfaces 4, preferably substantially parallel to one other.

Between the support protrusions 7 of the support portion 3 there is at least one central protrusion 7a that lays substantially on a median plane of the frame 2.

Preferably, the support portion 3 comprises two central support protrusions 7a that both lay substantially on the same plane as the frame 2 and at least two lateral protrusions 7b arranged between a respective support surface 4 and the central support protrusions 7a.

The central support protrusions 7a each have a substantially square or polygonal profile, whereas the lateral protrusions 7b each have a circular or rounded profile with a reduction in section towards a free end thereof.

As shown in FIGS. 1 to 3, the support protrusions 7 extends from a substantially ring-shaped base plate 8, which is removably engageable with the frame 2 between the support surfaces 4 of the latter. In this way, the engagement or disengagement of the support protrusions 7 with/from the frame 2 can be carried out by the application or removal of the base plate 8 through an action of an operator.

Always with reference to FIGS. 1 to 3, the frame 2 of the support template 1 comprises at least one centring portion 9 arranged to engage a respective centring seat (not visible in the attached figures) made on the respective mould so as to allow the correct alignment between the support template 1 and the mould itself in order to position the components C1, C2 of the helmet to be obtained according to a predetermined position and centred inside the mould.

Advantageously, the centring portion 9 comprises a plurality of centring pins 9a each arranged to engage a respective centring opening made on the respective mould responsible for moulding the helmet to be obtained.

In detail, the centring portion 9 comprises four centring pins 9a placed in pairs at opposite ends of the frame 2 of the support template 1.

The frame 2 also comprises at least one grip portion 10, preferably two, to allow the manual engagement of the support template 1 by an operator.

In particular, each grip portion 10 comprises at least one bar, preferably cylindrical, which extends inside the footprint of the frame 2 in proximity to a respective support surface 4.

Another object of the present invention is a moulding process of a sports helmet in particular a cycling helmet.

The moulding process comprises a step of positioning at least one component and/or insert C1, C2, I inside an open mould according to a predetermined position.

In detail, the positioning step provides for the simultaneous positioning of all of the components C1, C2 and the inserts I of the helmet to be obtained inside the open mould according to a predetermined position.

The positioning of the aforementioned components C1, C2 and of the inserts I of the helmet to be obtained is advantageously carried out by using the support template 1 described above.

In particular, the positioning step firstly provides for the arrangement of the support template 1. Then, at least one component C1, C2 of the helmet to be obtained, preferably all of the components C1, C2 and the inserts I that must be bound to the polystyrene base body are appropriately placed on the support template 1 according to predetermined positions.

Once all of the components C1, C2 and the inserts I of the helmet to be obtained have been arranged on the support template 1 according to the respective predetermined positions, the support template 1 is engaged with the open mould so that the components C1, C2 and the inserts I are correctly positioned and centred in the mould itself.

The engagement of the support template 1 with the respective mould is carried out through the centring pins 9a that insert into corresponding centring openings made in the corresponding mould.

Once the support template 1 has been engaged with the corresponding mould, one or more blocking mechanisms of the mould are actuated so as to block the components C1, C2 and the inserts I of the helmet to be obtained inside the mould itself together with the support elements 5 of the support template 1.

Thereafter, by acting directly on the grip portions 10 of the support template 1 the latter is removed from the corresponding mould.

Since the components C1, C2 and the inserts I of the helmet to be obtained are blocked together with the support elements 5 of the support template 1 inside the mould, they consequently disengage from the latter remaining in the mould.

The mould is hermetically closed to allow the usual moulding process at the end of which a helmet is obtained that is provided with the components C1, C2 and the inserts I initially arranged on the support template 1.

Once the moulding process is finished, the support elements 5 are easily removed from the base body of the helmet carried out by rotating one structural portion 6 with respect to the other.

The support template 1 for moulds for sports helmets, in particular cycling helmets, and the relative moulding process described above solve the problems encountered in the prior art and achieve important advantages.

First of all, the support template 1 and its use in the moulding process of helmets substantially simplifies the latter since it allows and ensures the correct positioning of all of the components C1, C2 and/or the inserts I of the helmet to be obtained inside the mould.

It should also be considered that the use of the support template 1 substantially speeds up the positioning operations of the components C1, C2 and/or of the inserts in the mould, since the operator, once the latter have been arranged on the support template, must only engage it with the mould and actuate the respective blocking mechanisms thereof.

This ease and simplicity in the insertion operations of the components C1, C2 and/or of the inserts I of the helmet to be obtained, determines a significant reduction of the production times for each helmet to be obtained with a consequent lowering of the relative production costs.

It must also be noted that the support template makes it possible to cut the usual moulding steps in half since the moulding process can be carried out in a single step that provides for the formation of the base body of the helmet to be obtained with the components C1, C2 and/or the inserts I of the helmet itself placed in the correct positions. Of course, the elimination of the conventional moulding step of the base body and the subsequent co-moulding step of the latter with the additional parts of the helmet, substantially reduces the production times for each piece to be made, allowing a significant increase in productivity of the moulding process.

Finally, it should be considered that the precise positioning of the components C1, C2 and/or of the inserts I of the helmet to be obtained inside the mould by means of the support template 1 totally eliminates or reduces as much as possible the presence of defects at the overlapping and/or juxtaposed areas between the upper shell and the lower ring or under-shell of the helmets made, ensuring the excellent quality thereof.

The invention claimed is:

1. A process for moulding a sports helmet, comprising:
   positioning components of a helmet to be obtained, inside an open mould, according to a predetermined position;
   closing the mould;
   moulding or co-moulding the helmet to be obtained, by a moulding process that can be performed by the mould;
   wherein the positioning the components of the helmet to be obtained inside the open mould is performed by:
      arranging a support template;
      positioning the components of the helmet to be obtained on the support template;
      engaging the support template with the open mould so that the components engaged thereon are placed centred according to a predetermined position;
      blocking the components inside the open mould according to the predetermined position by at least one mechanism of the mould; and
      disengaging the support template from the open mould, the disengaging also determining disengagement of the support template from the component of the helmet to be obtained,
   wherein the positioning of the components of the helmet to be obtained on the support template includes:
      positioning a lower ring of the helmet on a surface according to a predetermined position by a support portion of the support template, said support portion being provided with support projections, the support projections including support blocks for a portion of the lower ring of the helmet, and
      positioning an upper shell of the helmet according to a predetermined position by a support element at least partially arched provided on said support portion, said support element being provided with a first rest portion for lateral rest of the lower ring of the helmet and with a second rest portion for the upper shell of the helmet.

* * * * *